United States Patent
Volk et al.

(10) Patent No.: US 10,954,904 B2
(45) Date of Patent: Mar. 23, 2021

(54) PRESSURE-REGULATING DEVICE FOR A FUEL CONSUMPTION MEASUREMENT SYSTEM AND FUEL CONSUMPTION MEASUREMENT SYSTEM

(71) Applicant: AVL LIST GMBH, Graz (AT)

(72) Inventors: Alexander Volk, Kainbach Bei Graz (AT); Ruggero Leoncavallo, Gratkorn (AT); Andre Steinhoefler, Hartberg (AT)

(73) Assignee: AVL LIST GMBH, Graz (AT)

( * ) Notice: Subject to any disclaimer, the term of this patent is extended or adjusted under 35 U.S.C. 154(b) by 0 days.

(21) Appl. No.: 16/628,266

(22) PCT Filed: Jul. 5, 2018

(86) PCT No.: PCT/AT2018/060134
§ 371 (c)(1),
(2) Date: Jan. 3, 2020

(87) PCT Pub. No.: WO2019/006485
PCT Pub. Date: Jan. 10, 2019

(65) Prior Publication Data
US 2020/0217284 A1    Jul. 9, 2020

(30) Foreign Application Priority Data

Jul. 5, 2017   (AT) .............................. A 50560/2017

(51) Int. Cl.
*F02M 1/00*       (2006.01)
*F02M 37/00*      (2006.01)
(Continued)

(52) U.S. Cl.
CPC .... *F02M 37/0052* (2013.01); *F02M 63/0225* (2013.01); *F02D 33/006* (2013.01);
(Continued)

(58) Field of Classification Search
CPC ........ F02D 41/3845; F02D 2200/0602; F02M 63/0265; F02M 63/0275; F02M 69/465
(Continued)

(56) References Cited

U.S. PATENT DOCUMENTS 3,633,420 A    1/1972  Holzem
5,284,119 A *  2/1994  Smitley ................. F02D 33/006
                                                    123/497
(Continued)

FOREIGN PATENT DOCUMENTS

DE         1 798 080 B1    10/1973
DE        694 07 703 T2     8/1998
(Continued)

*Primary Examiner* — John Kwon
(74) *Attorney, Agent, or Firm* — Norman B. Thot

(57) ABSTRACT

A pressure-regulating device for a fuel consumption measurement system includes a fuel supply line which supplies fuel to a consumer, a fuel return line, a bypass line which branches off from the fuel supply line, a pressure regulator which sets a free flow cross-section in the bypass line, a pressure sensor arranged at the fuel supply line downstream of where the bypass line branches off, a control unit electrically connected to the pressure sensor, and a pressure-reducing element arranged in the fuel supply line upstream of the pressure sensor and downstream of the branch of the bypass line. The bypass line fluidically connects the fuel supply line to the fuel return line and feeds fuel from the fuel supply line to the fuel return line while bypassing the consumer. The pressure sensor provides pressure measurement values. The control unit regulates the pressure regulator depending on the pressure measurement values.

13 Claims, 1 Drawing Sheet

(51) Int. Cl.
*F02M 63/02* (2006.01)
*F02D 33/00* (2006.01)
*F02M 37/18* (2006.01)

(52) U.S. Cl.
CPC . *F02D 2200/0602* (2013.01); *F02M 37/0029* (2013.01); *F02M 37/18* (2013.01)

(58) Field of Classification Search
USPC .......... 123/445, 446, 456, 457, 495
See application file for complete search history.

(56) References Cited

U.S. PATENT DOCUMENTS

| | | | |
|---|---|---|---|
| 5,598,817 | A | 2/1997 | Igarashi et al. |
| 5,918,578 | A * | 7/1999 | Oda .................. F02D 41/22 |
| | | | 123/456 |
| 2004/0163459 | A1 | 8/2004 | Christian et al. |
| 2004/0211263 | A1 | 10/2004 | Wiesinger et al. |
| 2006/0277982 | A1 | 12/2006 | Christian et al. |
| 2014/0076281 | A1 | 3/2014 | Bernhaupt |
| 2016/0153818 | A1 | 6/2016 | Rosenkranz et al. |
| 2017/0218893 | A1 * | 8/2017 | Duerrwaechter ...... F02M 31/20 |
| 2018/0328315 | A1 * | 11/2018 | Taniel ................ B01F 13/0836 |

FOREIGN PATENT DOCUMENTS

| | | |
|---|---|---|
| DE | 10 2010 031 628 A1 | 2/2011 |
| EP | 1 437 578 A1 | 7/2004 |
| EP | 1 464 932 A2 | 10/2004 |
| EP | 1 729 100 A1 | 12/2006 |
| EP | 2 708 728 A2 | 3/2014 |
| JP | 58-124662 U | 8/1983 |
| JP | 62-017323 A | 1/1987 |
| JP | 62-032246 A | 2/1987 |
| JP | 03-73667 U | 7/1991 |
| JP | 07-083137 A | 3/1995 |
| JP | 2013-133797 A | 7/2013 |
| WO | WO 2015/003887 A1 | 1/2015 |
| WO | WO 2016/012609 A1 | 1/2016 |

* cited by examiner

US 10,954,904 B2

PRESSURE-REGULATING DEVICE FOR A FUEL CONSUMPTION MEASUREMENT SYSTEM AND FUEL CONSUMPTION MEASUREMENT SYSTEM

CROSS REFERENCE TO PRIOR APPLICATIONS

This application is a U.S. National Phase application under 35 U.S.C. § 371 of International Application No. PCT/AT2018/060134, filed on Jul. 5, 2018 and which claims benefit to Austrian Patent Application No. A 50560/2017, filed on Jul. 5, 2017. The International Application was published in German on Jan. 10, 2019 as WO 2019/006485 A1 under PCT Article 21(2).

FIELD

The present invention relates to a pressure-regulating device for a fuel consumption measurement system having a fuel supply line which is connectable to a consumer and through which fuel is supplied to the consumer, a fuel return line through which fuel is returned, a bypass line through which the fuel supply line is fluidically connected to the fuel return line and through which fuel is guided from the fuel supply line to the fuel return line bypassing the consumer, and a pressure regulator through which a free flow cross-section is adapted to be set in the bypass line, as well as a fuel consumption measurement system having a fuel supply line through which a tank is fluidically connected to a consumer and through which fuel is supplied from the tank to the consumer via a first fuel pump, a flowmeter in the fuel supply line, a fuel return line which is fluidically connected to the tank or the fuel supply line downstream of the flowmeter and through which fuel is returned to the tank or into the fuel supply line downstream of the flowmeter, and a feed pump in the fuel supply line downstream of the flowmeter.

BACKGROUND

Fuel consumption measurement systems usually consist of a module carrying out the actual fuel measurement performed via flowmeters, such as Coriolis meters, for example, or parallel-connected piston/displacement meter units, such as described in DE-AS 1 798 080, for example, and, for measurement systems comprising a fuel return line, additionally include a conditioning module via which a constant pressure is set in the fuel supply line.

These systems for fuel consumption measurement with a pressure-regulating device are arranged in front of the fuel high-pressure pump of a common-rail system of an internal combustion engine having a plurality of injection valves. These are either closed circuits where the fuel is fed from the fuel return line downstream of the actual measurement device back into the fuel supply line, or systems where a return line extending directly to the tank is provided in which a second flowmeter is arranged so that the fuel consumption can be calculated from the difference of the two flowmeters.

An exact measurement requires the fuel to be supplied at a constant supply line pressure to the consumer which is in particular an internal combustion engine with common rail injection. It is thereby common practice to arrange a pressure regulator configured as an overflow valve in the bypass line, which valve regulates the pressure in the bypass line and thus indirectly the pressure in the fuel supply line in that an increasing flow cross-section in the bypass line leads to an increase of the free flow cross-section. This regulation is passive, however, so that flow-independent changes of the pressure gradient are not taken into consideration, whereby errors in the consumption measurement due to pressure variations occur. It is also not possible to generate a supply line pressure of 0 bar or a vacuum pressure, which is, however, required depending on operating conditions.

Active pressure-regulating devices have been developed for this reason where, in addition to the pressure regulator in the bypass line, another pressure regulator which is configured as a pressure reducer is arranged in the fuel supply line. While the pressure regulation in the positive pressure range is continued to be performed via the overflow valve, at a setpoint of the supply line pressure in the negative range, the pressure reducer, which is in its completely open position without any pressure acting upon it, can be moved into a position in which the pressure reducer throttles or even closes the flow cross-section so that an increased pressure drop is generated due to which a vacuum pressure can be generated in the subsequent spur line. The necessary operating pressure for this pressure reducer can be built up by the overflow valve.

Such a configuration has the drawback, however, that two regulating elements are necessary for realizing zero pressures or vacuum pressures which further have a mutual effect on each other, whereby an exact regulation of the supply line pressure to a constant actual value becomes difficult. The capital expenditure for realizing such a pressure regulation is accordingly high.

SUMMARY

An aspect of the present invention is to provide a pressure-regulating device as well as a fuel consumption measurement system via which the most exact possible setting of the supply line pressure to a constant setpoint can be achieved with minimum equipment requirements and at minimum expense, and the largest possible pressure range can be set which also includes 0-pressures or vacuum pressures as supply line pressures relative to the atmospheric pressure. A further aspect of the present invention is to obtain reproducible measurement results by maintaining the same measurement conditions via such a pressure-regulating device.

In an embodiment, the present invention provides a pressure-regulating device for a fuel consumption measurement system. The pressure-regulating device includes a fuel supply line which is configured to be connected to a consumer and via which a fuel is suppliable to the consumer, a fuel return line via which the fuel is returnable, a bypass line comprising a branch which branches off from the fuel supply line, a pressure regulator which is configured to set a free flow cross-section in the bypass line, a pressure sensor arranged at the fuel supply line downstream of where the branch of the bypass line branches off from the fuel supply line, a control unit which is electrically connected to the pressure sensor, and an unregulated pressure-reducing element arranged in the fuel supply line upstream of the pressure sensor and downstream of the branch of the bypass line. The bypass line is configured to fluidically connect the fuel supply line to the fuel return line and to feed the fuel from the fuel supply line to the fuel return line while bypassing the consumer. The pressure sensor is configured to provide pressure measurement values. The control unit is configured to regulate the pressure regulator depending on the pressure measurement values of the pressure sensor.

BRIEF DESCRIPTION OF THE DRAWINGS

The present invention is described in greater detail below on the basis of embodiments and of the drawings in which.

DETAILED DESCRIPTION

Figure 1:
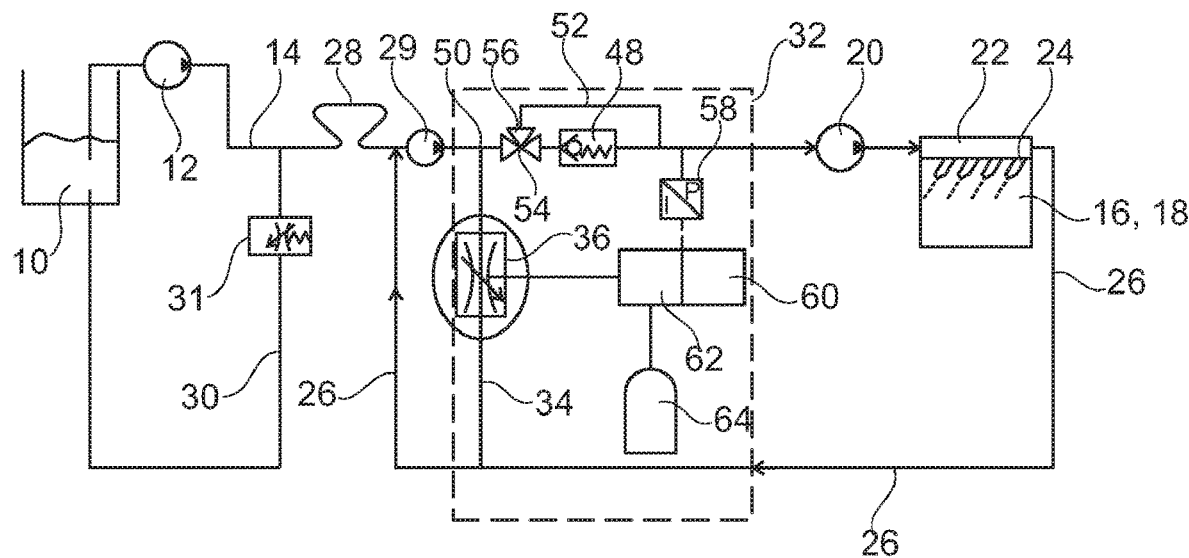
FIG. 1 shows a flow chart of a fuel consumption measurement device according to the present invention having a pressure-regulating unit according to the present invention.
Figure 2:
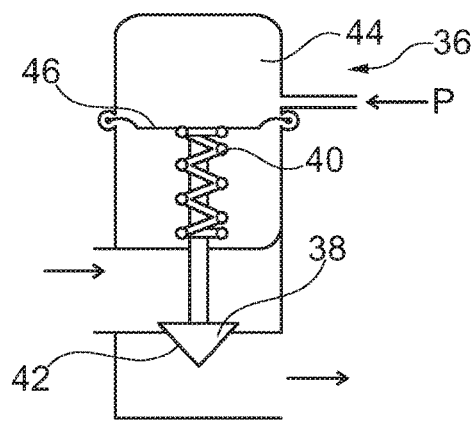
FIG. 2 shows a pressure regulator of the pressure-regulating unit according to the present invention.

Due to the fact that the flow regulating unit comprises a pressure sensor that is arranged at the fuel supply line downstream of the branch of the bypass line, that is electrically connected to a control unit via which the pressure regulator is adapted to be regulated as a function of the measurement values of the pressure sensor, wherein an unregulated pressure-reducing element is arranged in the fuel supply line upstream of the pressure sensor and downstream of the branch of the bypass line, an exact setpoint of the supply line pressure can be adjusted via the pressure regulator and equipment can be minimized since only one control element is necessary. A pressure below atmospheric pressure or atmospheric pressure can also be set via the pressure-reducing element without any additional control elements being necessary. The active regulation and pressure measurement lead to an exact setting of the measurement conditions and hence to reproducible measurement results.

The present invention also provides a fuel consumption measurement system which uses such a pressure-regulating device whose bypass line branches off the fuel supply line downstream of the flowmeter and enters the fuel return line. Such a fuel consumption measurement system supplies very exact measurement values across a wide setpoint spectrum with minimum equipment requirements.

In an embodiment of the present invention, the pressure-reducing element can, for example, be a check valve which prevents a return flow and which generates a pressure drop that is to a large extent constant but which depends on the current flow velocities. Negative pressures in the fuel supply line can thereby be generated with simple means when the pressure regulator is placed into a state in which the flow cross-section in the bypass line is wide open.

In an embodiment of the present invention, the pressure-reducing element can, for example, be throttle or an orifice. These components also generate a pressure drop between their inlet and their outlet due to which the settable pressure range can also be set to negative pressures in the subsequent fuel supply line section.

In an embodiment of the present invention, the pressure regulator can, for example, be a spring-loaded regulating valve. The spring can either load a regulating body of the regulating valve into a state in which the regulating cross-section of the valve is closed or into a state in which it is opened. Opening or closing is then performed only when a sufficient counterforce is generated via which the spring force is overcome. When using a valve closed by spring force, an adequate fuel supply of the internal combustion engine is provided even when the valve fails, since the fuel would be completely fed to the internal combustion engine.

In an embodiment of the present invention, the regulating valve can, for example, be a pneumatically operable valve. The air pressure for such a valve can either be provided via a separate pressure container, via pressure connectors at the internal combustion engine, or via pressure connectors in the building equipment. These valves have a very low power consumption while offering a very good regulating capability. Pneumatically operated valves are also less susceptible to failure since no fuel can enter electric components, which can lead to corrosion and in extreme cases to explosions if the fuel should come into contact with the electronic system.

The pneumatic pressure for operating the control valve is advantageously regulated by an electric pilot valve which is controlled via the control unit. The electric pilot valve can in particular be adapted to be electromagnetically operated, wherein the electromagnet is supplied with current depending on a comparison of the actual values of the pressure sensor with its setpoints, and hence provides a correspondingly regulated pressure for operating the pneumatic pressure regulator.

Alternatively to these embodiments, the pressure regulator can also be configured as an electric regulating valve which is controlled via the control unit and which directly regulates the flow cross-section. An additional component is thereby saved.

In an embodiment of the present invention, the pressure-reducing element can, for example, be adapted to be bypassed via a circuitous line. The complete pressure provided by the feed pump can hence also be used as the supply line pressure for the consumer although the static pressure-reducing element is arranged in the fuel supply line. The pressure range within which measurements can be taken is thus further increased.

In an embodiment of the present invention, a two-way valve can, for example, be arranged at a branch-off of the circuitous line branching off the fuel supply line, via which valve a switching between the two lines is possible in a simple manner.

The pressure-regulating device is also adapted to be fluidically connected, downstream of the pressure sensor and upstream of the consumer, to a feed pump which is usually configured as a high-pressure pump and which is thereby suitable for generating a negative pressure in the fuel supply line.

In an embodiment of the present invention, the bypass line can, for example, enter the fuel return line through which unconsumed fuel is returned into the pressure-regulating device. In particular in the case of diesel engines with direct injection, a considerable amount of fuel can therefore be partly returned, in particular from the distributor pipe of the common rail system.

In an embodiment of the present invention, in the fuel consumption measurement system, in particular for diesel applications, the fuel return line can, for example, therefore branch off of the fuel supply line or off of a distributor pipe of the consumer downstream of the pressure-regulating device and enter the pressure-regulating device upstream of where the bypass line enters the fuel return line.

A pressure-regulating device for a fuel consumption measurement system as well as a fuel consumption measurement system having such a pressure-regulating device are thus provided via which temporally resolved flow processes can be determined with high precision and in a continuous manner in that an exact supply line pressure in the fuel supply line can be measured and regulated in accordance with these measurement values. Errors caused by different flow velocities in the case of purely passive elements are thereby reliably avoided. These measurements can also be performed across a large pressure range which also includes negative pressures below atmospheric pressure. Merely one regulating element is necessary for this purpose so that the equipment requirements, and thus the number of components and the costs therefor, can be reduced.

The fuel consumption measurement system according to the present invention having the pressure-regulating device according to the present invention is illustrated in the drawings and is described in greater detail below.

The fuel consumption measurement system according to the present invention is composed of a tank 10 where fuel is stored. Fuel is pumped from tank 10 into a fuel supply line 14 via a first fuel pump 12. The fuel supply line 14 extends to a consumer 16 which is configured as an internal combustion engine 18 having a common rail injection system in the exemplary embodiment. The fuel supply line 14 accordingly extends to a feed pump 20 which is configured as high-pressure feed pump which forms part of the internal combustion engine 18 and via which the fuel is fed into a common rail distributor pipe 22 and compressed. The distributor pipe 22 is fluidically connected to injection valves 24 through which the fuel is injected into the combustion chambers of the internal combustion engine 18.

In these systems, larger fuel amounts are usually fed than are actually injected through the injection valves 24 so that a fuel return line 26 branches off the distributor pipe 22, the fuel return line 26 extending back to the fuel supply line 14. The returned fuel amounts can be a multiple of the injected fuel amounts.

A flowmeter 28 is arranged in the fuel supply line 14 to measure fuel consumption. The flowmeter 28 can, for example, be provided as a Coriolis meter or, for example, by parallel connection of a displacement meter having a movable piston. The rotatory displacement meter is arranged in the fuel supply line 14 for measuring purposes, the rotary displacement meter being driven by a drive motor. In a piston chamber, a piston displaceable in an inertia-free manner is arranged in the parallel line to the displacement device. A change of the volumetric flow in the fuel supply line 14 first results in a deflection of the piston, which deflection is measured by a path sensor. The measurement values are provided to a control unit which receives the values and which transmits corresponding control signals to the drive motor that is controlled so that the piston is always returned into its defined initial position, the volumetric flow thus being discharged as exactly as possible via the rotatory displacement device. Since a volume fed during a time interval can be associated with each speed of the rotatory displacement device, it is possible to calculate a fuel consumption from these values.

The flowmeter 28 measures the fuel consumption in the fuel supply line 14. The fuel return line 26 extending back to the fuel supply line 14 enters the fuel supply line 14 downstream of the flowmeter 28 and upstream of a feed pump 29, thereby preventing this fuel from being measured twice and being able to feed this fuel. When the consumer 16 takes up only a small amount of fuel, only small amounts of fuel need be supplied to the measurement system through the first fuel pump 12, which is why, upstream of the flowmeter 28, a further return line 30 branches off the fuel supply line 14, through which fuel can be returned to the tank 10 when a sufficient pressure prevails in the fuel supply line 14. A mechanical pressure regulator 31 is arranged for this purpose in the further return line 30 via which the pressure in front of the flowmeter 28 is set. It is also possible to regulate the pressure behind the flowmeter 28 via the mechanical pressure regulator 31.

An exact fuel consumption measurement can only be performed when a constant supply line pressure prevails in the fuel supply line 14 immediately in front of the feed pump 20. According to the present invention, this is achieved with a pressure-regulating device 32 comprising a bypass line 34 which branches off the fuel supply line 14 and enters the fuel return line 26, wherein the branch is arranged downstream of the flowmeter 28 and downstream of where the fuel return line 26 enters the fuel supply line 14 and of the feed pump 20. A pressure regulator 36 configured as a regulating valve is arranged in bypass line 34. Pressure regulator 36 comprises a regulating body 38 which is urged away from its valve seat 42 towards the opening of the flow cross-section by a spring 40. In the present case, pressure regulator 36 is pneumatically closed by introducing a pressure P into a pressure chamber 44 which is defined by a membrane 46 connected to the regulating body 38, wherein the pressure P acts, counter to the spring force, on the membrane 46, whereby the regulating body 38 is lowered to its valve seat 42 surrounding the flow cross-section once the product of the applied pressure P and the surface of the membrane 46 is larger than the force of the spring 40.

The pressure-regulating device 32 is also includes an unregulated, i.e., a static pressure-reducing element 48, which is configured as a check valve in the present exemplary embodiment, but which can also be configured as a throttle or as an orifice, and which is arranged in the fuel supply line 14 downstream of a branch 50 of the bypass line 34. Via pressure-reducing element 48, a pressure drop between its outlet and its inlet occurs which merely depends on the flow velocity, but which is to a large extent constant.

Pressure-reducing element 48 can be bypassed via a circuitous line 52. A branch-off 54 is provided directly upstream of the pressure-reducing element 48 for this purpose, in which branch-off a 3/2-way valve 56 is arranged that serves to provide that the supplied fuel optionally either flows via the pressure-reducing element 48 and further through the fuel supply line 14 or through the circuitous line 52 bypassing the pressure-reducing element 48. The circuitous line 52 enters the fuel supply line 14 again directly downstream of the pressure-reducing element 48.

Downstream of the pressure-reducing element 48, and also downstream of where the circuitous line 52 enters the fuel supply line 14 in the present exemplary embodiment, but upstream of the feed pump 20, a pressure sensor 58 is arranged at the fuel supply line 14, via which pressure sensor 58 the supply line pressure in the fuel supply line 14 is measured. Pressure sensor 58 converts the pressure into a corresponding electric signal which is supplied to a control unit 60. Control unit 60 serves to control an electric pilot valve 62 via which a pressure from a pressure container 64 or another pressurized-air supply source is controlled and supplied to the pressure sensor 36 or the pressure chamber 44 of the pressure regulator 36. The pressure regulator 36 in the bypass line 34 is accordingly regulated depending on the difference between the actual values of the pressure sensor 58 and setpoints transmitted to the control unit 60.

If a central controller determines that the fuel consumption is to be measured at a supply line pressure of 1 bar in the fuel supply line 14, but the actual value measured by the pressure sensor 58 is only 0.5 bar, the pressure regulator 36 is shifted further into a closed state in that the electric pilot valve 62 increases the pressure fed into the pressure chamber 44. The pressure in the fuel supply line 14 thus increases up to the desired setpoint. If smaller setpoints are specified, they may be below atmospheric pressure since the already low pressure prevailing in front of the pressure-reducing element 48 when the pressure regulator 36 is fully open is further reduced due the pressure drop occurring at the pressure-reducing element and hence may be decreased to 0 bar or even −0.5 bar. If particularly high setpoints are required, the pressure regulator 36 can be fully closed and the 3/2-way valve 56 can additionally be switched so that no pressure drop occurs via the pressure-reducing element 48. This bypassing of the pressure-reducing element 48 can even take place starting at pressures of approximately 1.5 bar in order to reduce the load acting on the feed pump 29.

The pressure-regulating device 32 according to the present invention thus allows for exact fuel consumption measurements across a large pressure range to be performed. These consumption measurements can be performed both at maximum feed pressures of the feed pump and at low feed pressures which can further be regulated down to −0.8 bar at the fuel supply line. The fuel pressure setpoint is thus set by the electronic control loop in a very short time taking into consideration the actual value of the pressure determined by the pressure sensor so that high regulation accuracy and velocity are achieved. This leads to very exact and reproducible measurement results of the fuel consumption measurement system so that measurements can repeatedly be taken at exactly defined measurement conditions and then compared. Due to the simple configuration of the regulating units used and the small number of elements to be regulated, equipment requirements and thus expense are reduced compared to prior art actively regulating pressure-regulating devices.

It is appreciated that the present invention is not limited to the described exemplary embodiment and that various modifications are possible. It is in particular conceivable that instead of the pneumatic pressure regulator, a hydraulic or purely electric pressure regulator can be used. The control unit of an electric regulating valve can thus, for example, be used with the values of the pressure sensor for direct electric control of the regulating valve. It is further understood that various configurations of fuel consumption measurement systems are known where this pressure-regulating device can be used. The section of the fuel return line upstream of the mouth of the bypass line is hence in particular omitted in the case of gasoline applications where no increased fuel feed with return flow from the distributor takes place. Reference should also be had to the appended claims.

What is claimed is:

1. A pressure-regulating device for a fuel consumption measurement system, the pressure-regulating device comprising:
   a fuel supply line which is configured to be connected to a consumer and via which a fuel is suppliable to the consumer;
   a fuel return line via which the fuel is returnable;
   a bypass line comprising a branch which branches off from the fuel supply line, the bypass line being configured to fluidically connect the fuel supply line to the fuel return line and to feed the fuel from the fuel supply line to the fuel return line while bypassing the consumer;
   a pressure regulator which is configured to set a free flow cross-section in the bypass line;
   a pressure sensor arranged at the fuel supply line downstream of where the branch of the bypass line branches off from the fuel supply line, the pressure sensor being configured to provide pressure measurement values;
   a control unit which is electrically connected to the pressure sensor, the control unit being configured to regulate the pressure regulator depending on the pressure measurement values of the pressure sensor; and
   an unregulated pressure-reducing element arranged in the fuel supply line upstream of the pressure sensor and downstream of the branch of the bypass line.

2. The pressure-regulating device as recited in claim 1, wherein the unregulated pressure-reducing element is a check valve.

3. The pressure-regulating device as recited in claim 1, wherein the unregulated pressure-reducing element is a throttle or an orifice.

4. The pressure-regulating device as recited in claim 1, wherein the pressure regulator is a spring-loaded regulating valve.

5. The pressure-regulating device as recited in claim 4, wherein the spring-loaded regulating valve is pneumatically operable.

6. The pressure-regulating device as recited in claim 5, further comprising:
   an electric pilot valve,
   wherein,
   the control unit is further configured to control the electric pilot valve, and
   a pneumatic pressure for operating the spring-loaded regulating valve is regulated via the electric pilot valve.

7. The pressure-regulating device as recited in claim 1, wherein the pressure regulator is an electric regulating valve which controlled by the control unit.

8. The pressure-regulating device as recited in claim 1, further comprising:
   a circuitous line which is configured to bypass the pressure-reducing element.

9. The pressure-regulating as recited in claim 8, further comprising:
   a 3/2 valve,
   wherein,
   the circuitous line comprises a branch which branches off from the fuel supply line (14), and
   the 3/2 valve is arranged at the branch.

10. The pressure-regulating device as recited in claim 1, further comprising:
    a feed pump arranged downstream of the pressure sensor (58) and upstream of the consumer in the fuel supply line,
    wherein,
    the pressure-regulating device is configured to be fluidically connected to the feed pump.

11. The pressure-regulating device as recited in claim 1, wherein,
    the bypass line is configured to enter into the fuel return line, and
    the fuel return line is configured to return the fuel which is not consumed to the pressure-regulating device.

12. A fuel consumption measurement system comprising:
    a fuel supply line which is configured to fluidically connect a tank to a consumer and via which a fuel is supplied from the tank to the consumer via a first fuel pump;
    a flowmeter arranged in the fuel supply line;
    a fuel return line which is fluidically connected to the tank or to the fuel supply line downstream of the flowmeter and via which the fuel is returnable to the tank or into the fuel supply line downstream of the flowmeter;
    a feed pump arranged in the fuel supply line downstream of the flowmeter; and
    the pressure-reducing device as recited in claim 1, wherein, the bypass line of the pressure-reducing device branches off from the fuel supply line and enters the fuel return line downstream of the flow meter.

13. The fuel consumption measurement system as recited in claim 12, wherein the fuel return line is configured to branch off from the fuel supply line or from a distributor pipe of the consumer downstream of the pressure-regulating device and to enter the pressure-regulating device upstream of where the bypass line enters the fuel return line.

* * * * *